US006462789B1

United States Patent
Zoso et al.

(10) Patent No.: US 6,462,789 B1
(45) Date of Patent: Oct. 8, 2002

(54) CIRCUIT AND METHOD FOR GENERATING CHROMINANCE LOCK

(75) Inventors: Luciano Zoso, Chandler, AZ (US); Nicholas J. M. Spence, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/277,158

(22) Filed: Mar. 26, 1999

(51) Int. Cl.$^7$ ................................................ H04N 9/65
(52) U.S. Cl. ........................ 348/642; 348/539; 348/536
(58) Field of Search ................................. 348/505, 507, 348/508, 536, 510, 537, 642, 520, 539; H04N 9/65

(56) References Cited

U.S. PATENT DOCUMENTS 5,526,055 A * 6/1996 Zhang et al. ................ 348/510
5,786,866 A * 7/1998 Sani et al. ................... 348/520
6,175,385 B1 * 1/2001 Koyiyama et al. .......... 348/537

* cited by examiner

*Primary Examiner*—David E. Harvey
(74) *Attorney, Agent, or Firm*—Lanny L. Parker; Mark J. Fink

(57) ABSTRACT

A digital video encoder (16) receives a reference clock signal (REF_CLK27) for determining both a short term and a long term phase correction factor. A pulse detector (46) determines a number of sample clock (CLK324) time periods between the reference clock signal (REF_CLK27) and a clock signal (CLK27) that is derived from the data received by the digital video encoder (16). A phase increment generator (56) supplies an accumulator circuit (58) with a long term phase increment value based on the number of sample clocks and a TV_standard signal. A counter (60) and a phase look-up table (62) supply a short term increment value. The combined short term and long term increment values provide phase and frequency accuracy for the video subcarrier signal.

15 Claims, 4 Drawing Sheets

CIRCUIT AND METHOD FOR GENERATING CHROMINANCE LOCK

BACKGROUND OF THE INVENTION

The present invention relates, in general, to encoding and decoding data processing systems and, more particularly, to digital video encoder devices.

Digital video encoders convert digital data such as $YC_BC_R$ and RGB into analog composite video or S-Video signals for viewing on a television screen. Usually the video data received by the digital video encoder is transferred through an ITU-R 656 interface circuit. The data received by the interface circuit is expected to have a specific number of pixels for each horizontal line that is displayed, a specific number of pixels per frame, and a stable clock. Digital video encoder performance is sensitive to clock instability that is caused by the modulation process. The chrominance quality is more affected by clock variations than luminance quality.

Digital video decoders have an input for receiving data from a Video Cassette Recorder (VCR), an antenna, a satellite receiver, a digital camera, or other electronic device. The analog signals can be received in an S-Video format having the luminance and chrominance signals separated or in a composite video format having the luminance and chrominance signals combined. The digital video decoder converts the analog input signals into digital components (e.g., $YC_BC_R$ and RGB).

When the video source is a VCR, the line-to-line variations caused by mechanical limitations can be up to ±50 nanoseconds in the active video region and as high as ±5 microseconds at the end of each field. These timing variations affect the stability of the clock recovered by the video decoder. As a consequence, when the digital components are encoded by a digital encoder, the clock variations affect the chrominance subcarrier signal that is generated by the digital encoder, which directly affects the chroma quality of the viewable data. Prior art systems have attempted to generate a stable chrominance subcarrier signal by sending frequency correction information for each line of data from the digital video decoder to the digital video encoder. The frequency correction information can be transmitted via a serial interface, transmitted as ancillary data over the ITU-R 656 interface, or transmitted in other ways.

Accordingly, it would be advantageous to have a digital video encoder capable of generating chrominance data with no degradation when a VCR source is used. It would be of further advantage to eliminate the need for the digital video decoder to transmit any frequency correction data along with the data.

DETAILED DESCRIPTION OF THE DRAWINGS

Figure 1:
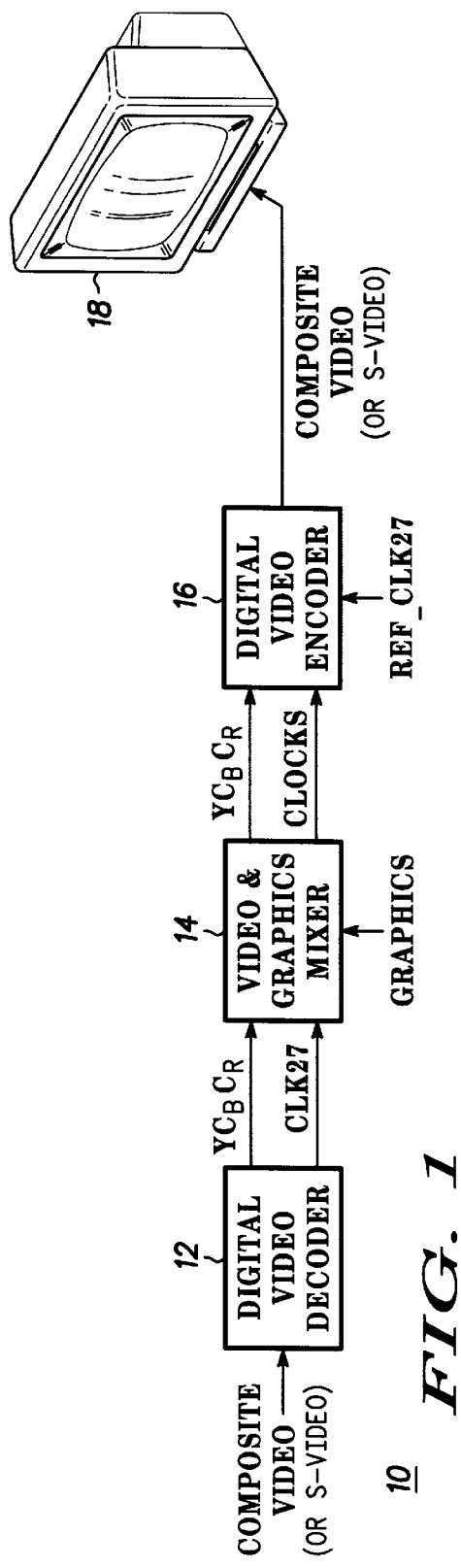
FIG. 1 is a block diagram of a digital video system that includes a digital video encoder.

FIG. 1 is a block diagram of a digital video system 10. Digital video system 10 includes a digital video decoder 12 having an input for receiving data from, for example, a Video Cassette Recorder (VCR), an antenna, a satellite receiver box, a digital camera, among others. Digital video decoder 12 generates $YC_BC_R$ data for transmission, along with a 27 Megahertz (MHz) clock signal, where Y is luminance data and $C_BC_R$ is chrominance information. Digital video decoder 12 transmits the clock signal CLK27 having a frequency of 27 MHz and the data stream of $YC_BC_R$ data to mixer 14. Data can be sent on a single eight bit bus through an ITU-R interface circuit, or over two eight bit buses, one bus for the Y data and the other bus for the $C_BC_R$ data. Alternatively, the data could be sent over three eight bit buses, one bus for the Y data, another bus for the $C_B$ data, and yet another bus for the $C_R$ data.

When the ITU-R interface is used, the Y data is transmitted on every other cycle of the clock signal CLK27, a data rate of 13.5 MHz. The $C_BC_R$ chrominance pair is transmitted when the Y data is not being transmitted, and $C_R$ data alternates with $C_B$ data in the data stream. Thus, $C_B$ and $C_R$ data are each transmitted at a 6.75 MHz data rate, and the $C_BC_R$ chrominance pair is transmitted at the 13.5 MHz data rate. By way of example, the $YC_BC_R$ data is transmitted in data packets, with a data packet being comprised of $C_B$ data, followed by Y data, then $C_R$ data, and a second Y data. One data packet is transmitted in four clock periods of the clock signal CLK27.

Mixer 14 receives the eight bit data stream of $YC_BC_R$ data from digital video decoder 12. Mixer 14 separates the luminance data from the chrominance data and interpolates the chrominance data. Interpolation provides the chrominance data that was intentionally not transmitted from digital video decoder 12 as a way of reducing data bandwidth. Mixer 14 mixes graphics components with the $YC_BC_R$ video components. Typically, a graphics processor (not shown) generates the graphics components. A first output of mixer 14 provides $YC_BC_R$ data in 4:4:4 format to an input of digital video encoder 16. Twenty-four bits of $YC_BC_R$ data are transmitted at a 13.5 MHz data rate. A second output of mixer 14 provides clock signals such as, for example, a clock signal CLK13.5 having a frequency of 13.5 MHz, a clock signal CLK27 having a frequency of 27 MHz, and a clock signal CLK324 having a frequency of 324 MHz. Alternatively, the clock signal CLK324 could be provided from a source other than mixer 14.

Digital video encoder 16 receives the $YC_BC_R$ data in 4:4:4 format, the clock signals CLK27, CLK13.5, CLK324, and a reference clock signal REF_CLK27. The reference clock signal can be crystal controlled and supplied to digital video encoder 16 as a signal REF_CLK27 having a frequency of 27 MHz. Digital video encoder 16 generates the composite video or S-video signal that is transmitted to a monitor 18 for viewing.

Figure 2:
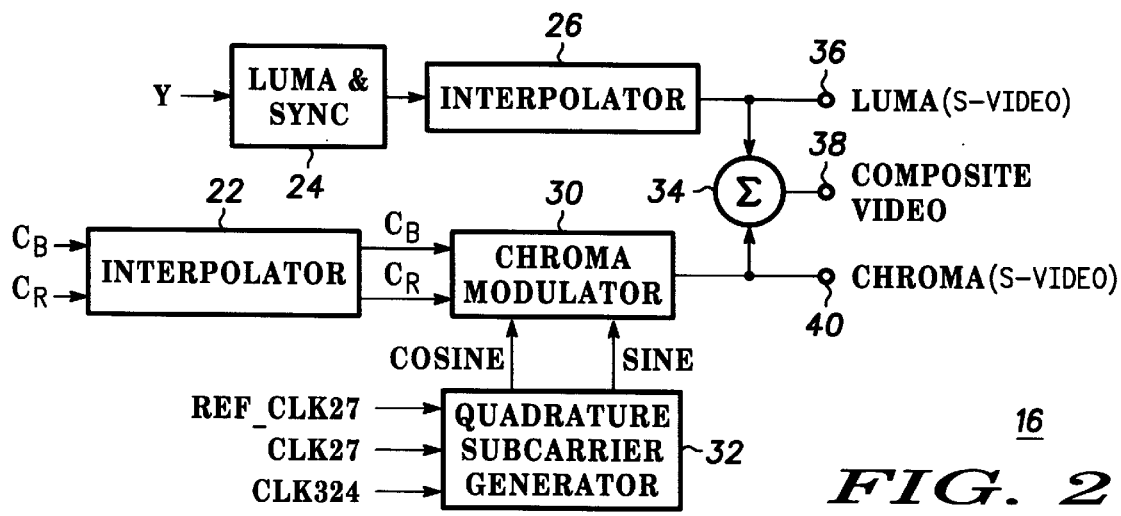
FIG. 2 is a block diagram of a portion of the digital video encoder as shown in FIG. 1.

FIG. 2 is a block diagram of a portion of digital video encoder 16. It should be noted that the same reference numbers are used in the figures to denote the same elements. Encoder 16 receives the Y data, the $C_BC_R$ data, and the clock signals REF_CLK27, CLK27, and CLK324, and generates video signals for luma, composite video, and chroma at respective output terminals 36, 38, and 40. Adder 34 has inputs connected to output terminals 36 and 40 for receiving the luma and chroma data, respectively, and generating the composite video data at output terminal 38. Digital video system 10 generates a stable chroma subcarrier signal that is locked in frequency to the signal REF_CLK27.

Luma/sync circuit 24 receives the Y data having a sampling frequency of 13.5 MHz from mixer 14 and generates the National Television System Committee (NTSC) or Phase Alternation by Line (PAL) horizontal and vertical sync signals depending upon the type of color television screen in use. Luma/sync circuit 24 adds sync signals to the Y data. An interpolator 26 has an input connected to the output of luma/sync circuit 24. Interpolator 26 converts the sampling frequency of the data received from luma/sync circuit 24 from 13.5 MHz to a frequency of 27 MHz. An output of interpolator 26 is connected to an output terminal 36 of encoder 16 for supplying the luminance (S-video) data. Alternatively, in another embodiment, interpolator 26 could receive the Y data and the input of luma/sync circuit 24 could be connected to the output of interpolator 26.

Encoder 16 further includes an interpolator 22 that receives the $C_B$ and $C_R$ data having a frequency of 13.5 MHz from mixer 14 and converts the data to a frequency of 27 MHz. A first output of interpolator 22 is connected to a first input of a chrominance modulator 30 for supplying $C_B$ data. A second output of interpolator 22 is connected to a second input of chrominance modulator 30 for supplying $C_R$ data. Chrominance modulator 30 generates chrominance data. A quadrature subcarrier generator 32 receives the clock signals REF_CLK27, CLK27, and CLK324, and generates the signals SINE and COSINE.

Figure 3:
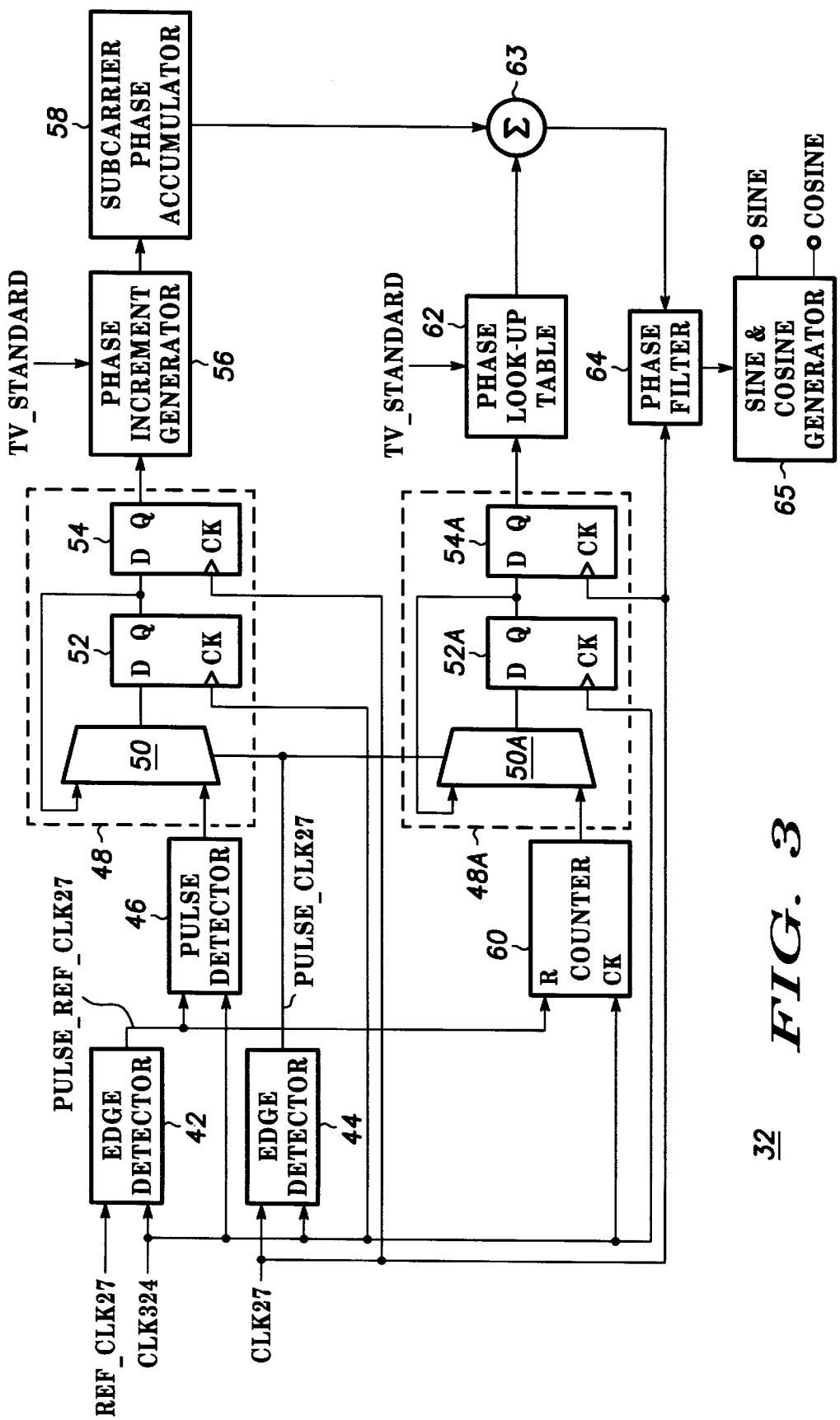
FIG. 3 is a block diagram of a quadrature subcarrier generator as shown in FIG. 2.

FIG. 3 is a block diagram of quadrature subcarrier generator 32 as shown in FIG. 2. Quadrature subcarrier generator 32 includes edge detector circuits 42 and 44. Edge detector circuit 42 has inputs for receiving the clock signals REF_CLK27 and CLK324 and an output that supplies a pulse signal PULSE_REF_CLK27. Edge detector circuit 44 has inputs for receiving the clock signals CLK27 and CLK324 and an output that supplies a pulse signal PULSE_CLK27.

Pulse detector circuit 46 has a first input connected to the output of edge detector circuit 42 and a second input that receives the clock signal CLK324. A capture circuit 48 has an input connected to the output of pulse detector circuit 46 and additional inputs for receiving the signals PULSE_CLK27, CLK324, and CLK27. Together, pulse detector circuit 46 and capture circuit 48 are referred to as a detector circuit. Capture circuit 48 includes a two input multiplexer (MUX) 50. Mux 50 has first and second data inputs, a selector input, and an output. The first data input of mux 50 is connected to the output of pulse detector circuit 46. The selector input of mux 50 is connected to the output of edge detector circuit 44. Capture circuit 48 includes D-latches 52 and 54, each having a data input D, a clock input CK, and an output Q. The data input of D-latch 52 is connected to the output of mux 50. The clock input of D-latch 52 receives the clock signal CLK324. The output of D-latch 52 is commonly connected to the data input of D-latch 54 and to the second data input of mux 50. The clock input of D-latch 54 receives the clock signal CLK27. The output of D-latch 54 is also the output of capture circuit 48 and is connected to an input of a phase increment generator 56. Another input of phase increment generator 56 is coupled for receiving the signal TV_standard. The user defined signal TV_standard selects one of the standard color television systems, such as NTSC, PAL, PAL-M, or PAL-N, that are used in North America, Europe, and South America. NTSC and PAL systems have different color subcarrier frequencies, horizontal and vertical sync frequencies, and different number of lines per picture frame. An output of phase increment generator 56 is connected to the input of subcarrier phase accumulator 58. Pulse detector circuit 46, capture circuit 48, phase increment generator 56, and subcarrier phase accumulator 58 provide a signal path that is referred to as a long term stability path.

A counter 60 receives the signal CLK324 at a clock input CK and the signal PULSE_REF_CLK27 at a reset input R. An output of counter 60 is connected to an input of a capture circuit 48A. The letter A is appended to the reference numbers to indicate that capture circuit 48A has the same elements as capture circuit 48. However, it should be noted that capture circuit 48 receives two bits of data, while capture circuit 48A receives four bits of data. Capture circuit 48A has inputs for receiving the signals PULSE_CLK27, CLK324, and CLK27. In particular, capture circuit 48A includes a two input multiplexer (MUX) 50A. Mux 50A has first and second data inputs, a selector input, and an output. The first data input of mux 50A is connected to the output of counter 60. The selector input of mux 50A is connected to the output of edge detector circuit 44. Capture circuit 48A includes D-latches 52A and 54A, each having a data input D, a clock input CK, and an output Q. The data input of D-latch 52A is connected to the output of mux 50A. The clock input of D-latch 52A receives the clock signal CLK324. The output of D-latch 52A is commonly connected to the data input of D-latch 54A and to the second data input of mux 50A. The clock input of D-latch 54A receives the clock signal CLK27. The output of D-latch 54A is also the output of capture circuit 48A and is connected to an input of a phase look-up table 62. Phase look-up table 62 also receives the signal TV_standard. Counter 60, capture circuit 48A, and phase look-up table 62 provide a signal path that is referred to as a short term stability path.

Quadrature subcarrier generator 32 further includes an adder 63 having a first input connected to the output of subcarrier phase accumulator 58 and a second input connected to the output of phase look-up table 62. A phase filter 64 has an input connected to an output of adder 63 and another input coupled for receiving the clock signal CLK27. An output of phase filter 64 is connected to an input of sine and cosine generator 65. Outputs of sine and cosine generator 65 are also outputs of quadrature subcarrier generator 32 and supply the signals sine and cosine.

Figure 4:
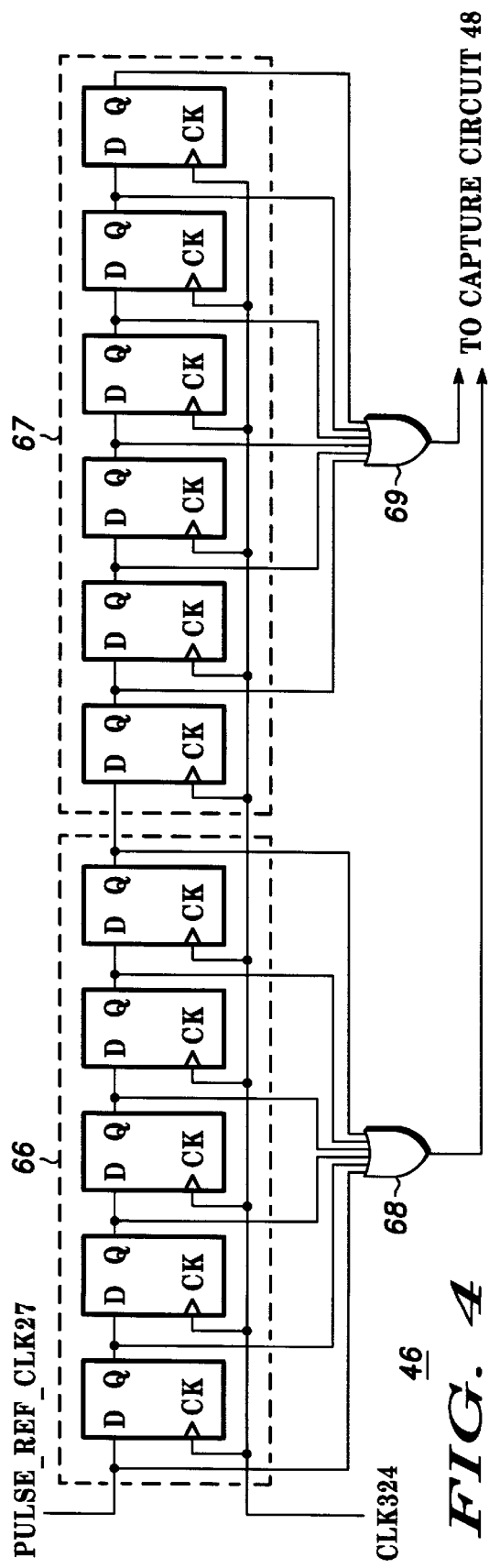
FIG. 4 shows a schematic diagram of a pulse detector circuit of FIG. 3.

FIG. 4 shows a schematic diagram of pulse detector circuit 46 of FIG. 3. Pulse detector circuit 46 has five D-latches that form a delay line 66 and another six D-latches that form a delay line 67. The D-latches in delay lines 66 and 67 have commonly connected clock inputs that receive the clock signal CLK324. The data input of the first D-latch in delay line 66 receives the signal PULSE_REF_CLK27. The output of the last D-latch in delay line 66 is connected to the data input of the first D-latch in delay line 67. The outputs of the D-latches in delay line 66 are connected to inputs of OR-gate 68. The outputs of the D-latches in delay line 67 and the signal PULSE_REF_CLK27 are connected to inputs of OR-gate 69. The outputs of OR-gates 68 and 69 provide a two bit data value at the output of pulse detector circuit 46. Alternatively, pulse detector circuit could be implemented as a counter and associated logic gates instead of two delay lines.

Figure 5:
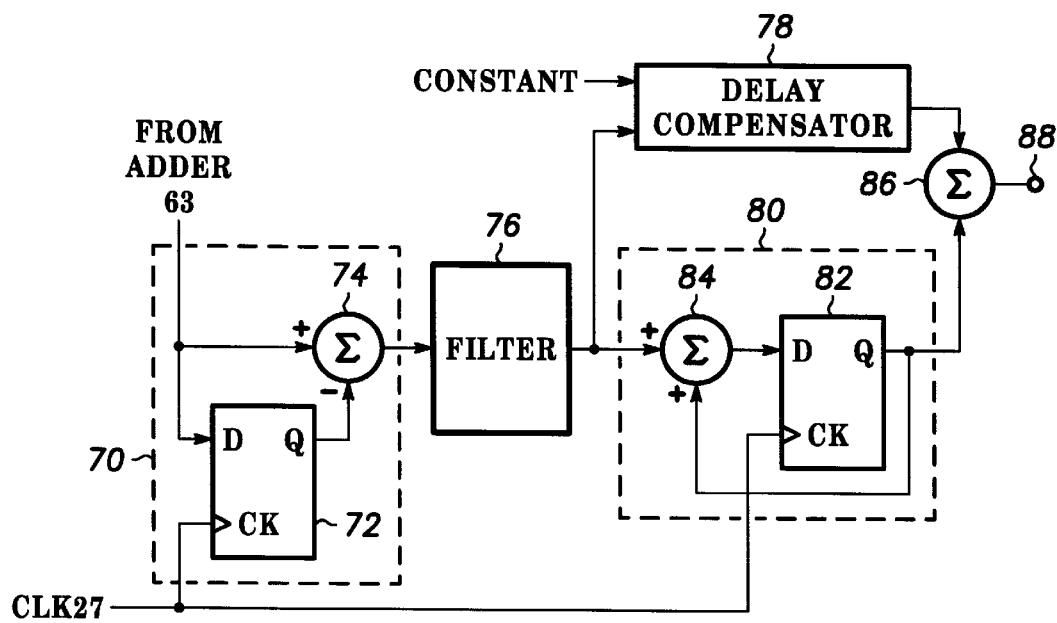
FIG. 5 is a block diagram of the phase filter that is shown in FIG. 3.

FIG. 5 is a block diagram of phase filter 64 that is shown in FIG. 3. Phase filter 64 includes a differentiator 70, followed by a filter 76 and an integrator 80. Differentiator 70 includes a D-latch that has a data input that is connected to the input of differentiator 70 and to the input of phase filter 64. The input of differentiator 70 is also connected to a first input of subtractor 74, i.e., the positive input. The output of D-latch 72 is connected to a second input of subtractor 74, i.e., the negative input. The clock input of D-latch 72 receives the clock signal CLK27. An output of D-latch 72 is connected to a second input of subtractor 74. The output of subtractor 74 is also the output of differentiator 70.

Filter 76 has an input connected to the output of differentiator 70. The output of filter 76 is commonly connected to an input of integrator 80 and to a first input of delay compensator 78. A second input of delay compensator 78 receives a constant value. Integrator 80 includes an adder 84 having a first input connected to the input of integrator 80. An output of adder 84 is connected to the data input of a D-latch 82. The clock input of D-latch 82 is coupled for receiving the clock signal CLK27. The output of D-latch 82 is commonly connected to a second input of adder 84 and to the output of integrator 80. Both the output of delay compensator 78 and the output of integrator 80 are connected as inputs of adder 86. The output of adder 86 is connected to terminal 88, which is also the output of phase filter 64.

In operation, referring to FIG. 3, edge detector circuit 42 includes several latches (not shown) clocked by the clock signal CLK324 that provide the signal PULSE_REF_CLK27 at an output terminal. The signal PULSE_REF_CLK27 is a pulse that is generated in response to a rising edge of the clock signal REF_CLK27. Similarly, edge detector circuit 44 has several latches (not shown) clocked by the clock signal CLK324 that provide a signal PULSE_CLK27 at an output terminal. The signal PULSE_CLK27 is a pulse that is generated in response to a rising edge of the clock signal CLK27. The signals PULSE_REF_CLK27 and PULSE_CLK27 have pulse widths that match the period of the clock signal CLK324. Edge detector circuit 42 and edge detector circuit 44 minimize metastable states in generating the respective signals PULSE_REF_CLK27 and PULSE_CLK27.

Figure 6:
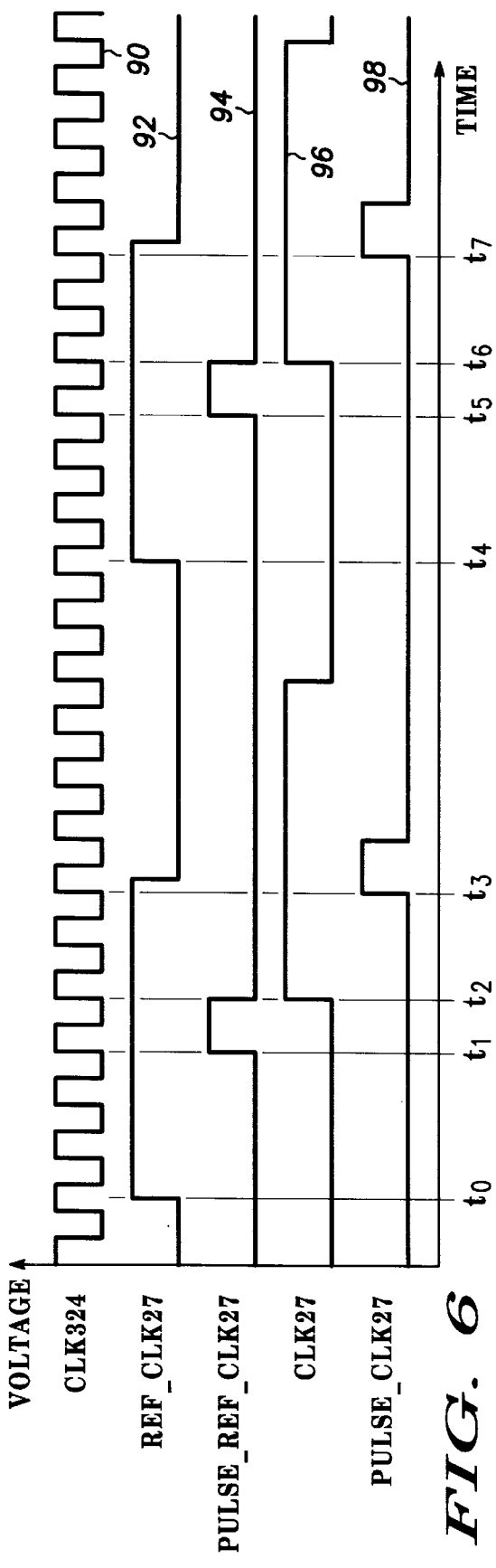
FIG. 6 is a diagram that shows clock signals and pulses generated by the edge detectors.

FIG. 6 is a diagram that shows timing relationships between clock signals and the pulses generated by edge detectors 42 and 44. The horizontal axis represents time and the vertical axis represents voltage. Waveforms 90, 92, and 96 illustrate the clock signals CLK324, REF_CLK27, and CLK27, respectively. It should be pointed out that the signal REF_CLK27 is a reference clock that is supplied to digital video encoder 16 (see FIG. 1) having substantially the same frequency as the clock signal CLK27. The signal PULSE_REF_CLK27 is illustrated by waveform 94 and shows a pulse generated at time $t_1$ by edge detector circuit 42 in response to the rising edge of the signal REF_CLK27 at time $t_0$. The signal PULSE_REF_CLK27 has another pulse generated at time $t_5$ in response to the rising edge of the signal REF_CLK27 at time $t_4$. Similarly, the signal PULSE_CLK27 is illustrated by waveform 98 and shows a pulse generated at time $t_3$ by edge detector circuit 44 in response to the rising edge of the signal CLK27 at time $t_2$. The signal PULSE_CLK27 has another pulse generated at time $t_7$ in response to the rising edge of the signal CLK27 at time $t_6$.

Briefly referring to FIGS. 3 and 4, pulse detector circuit 46 receives the signal PULSE_REF_CLK27 and clocks that signal through delay lines 66 and 67. The signal PULSE_REF_CLK27, generated from the reference signal REF_CLK27, has substantially the same frequency as the signal PULSE_CLK27, generated from the clock signal CLK27. However, the two signals, REF_CLK27 and CLK27, may have phases and frequencies that slightly differ from one another, i.e., the phases and frequencies of the signals REF_CLK27 and CLK27 are not matched. Pulse detector circuit 46 and capture circuit 48 determine whether the signal CLK27 has a higher frequency, the same frequency, or a lower frequency than the reference signal REF_CLK27.

The two data bits at the output of capture circuit 48 have a value of 00, 01, 10, or 11, depending upon the phase and frequency of the signals CLK27 and REF_CLK27. By way of example, when pulse detector circuit 46 and capture circuit 48 do not detect a rising edge of the signal PULSE_REF_CLK27 in-between two consecutive pulses of the signal PULSE_CLK27, the two data bits have a value of 00. Pulse detector circuit 46 receives the signal PULSE_REF_CLK27 and passes that pulse through delay line 66 and delay line 67 in twelve clock periods of the signal CLK324. The signal CLK324 is chosen to have a frequency that is 12 times the frequency of the signal CLK27. If capture circuit 48 has not received the signal PULSE_REF_CLK27 within twelve consecutive cycles of the signal CLK324, then the two data bits at the output of capture circuit 48 have a value of 00. When the two data bits have a value of 00, the frequency of the signal CLK27 is higher than the frequency of the signal REF_CLK27.

The two data bits having values of either 01 or 10 indicate that pulse detector circuit 46 and capture circuit 48 have detected a rising edge of the signal PULSE_REF_CLK27 in-between the rising transition edges of two consecutive pulses of the signal PULSE_CLK27. The signal PULSE_REF_CLK27 initiates a one value that is shifted through the plurality of D-latches of delay line 66. Based on the example illustrated in FIG. 6, the signal PULSE_REF_CLK27 has a rising edge at time $t_1$. In this example, the output of OR-gate 68 supplies the Most Significant Bit (MSB) data and has a one value at time $t_1$. When the two data bits at the output of capture circuit 48 have a value of 10, the frequency of the signal CLK27 is about the same as the frequency of the signal REF_CLK27. A further possibility is that the signals CLK27 and REF_CLK27 have about the same frequency, but the signals are shifted further in phase from one another than the example illustrated in FIG. 6. Then, the two data bits at the output of capture circuit 48 would have a value of 01.

When the two data bits have a value of 11, pulse detector circuit 46 and capture circuit 48 have detected two rising edges of the signal PULSE_REF_CLK27 in-between the rising edges of the signal PULSE_CLK27. Both OR-gate 68 and OR-gate 69 generate logic one values at their outputs, indicating that the frequency of the signal CLK27 is lower than the frequency of the signal REF_CLK27.

The two data bits from pulse detector circuit 46 and capture circuit 48 are passed to phase increment generator 56. Phase increment generator 56 includes muxes or selector logic (not shown) that select a phase increment value for transfer to subcarrier phase accumulator 58. The phase increment value is partially based upon the user defined TV_standard, such as NTSC, PAL, PAL-M, or PAL-N. A delta value, based on the selected TV_standard, is transferred from phase increment generator 56 to subcarrier phase accumulator 58 when the two data bits from detector circuit 46 have a value of either 01 or 10. The delta value is defined as $2^{N*} (f_{sc}/f_s)$ and rounded to the nearest integer, where N is the number of data bits in subcarrier phase accumulator 58, $f_{sc}$ is the subcarrier frequency, and $f_s$ is the clock frequency. For this example, N has a value of thirty data bits, $f_{sc}$ has a value such as 3.579 MHz (NTSC standard) or 4.434 MHz (PAL standard), and $f_s$ has a value of 27 MHz. When the two data bits from detector circuit 46 have a value of 11, subcarrier phase accumulator 58 receives a phase increment value that is two times the delta value. When the two data bits from detector circuit 46 have a value of 00, subcarrier phase accumulator 58 receives a phase increment value of zero.

Subcarrier phase generator accumulator circuit 58 includes an accumulator that adds the phase increment value from phase increment generator 56 to previous increment values. Subcarrier phase generator accumulator circuit 58 maintains a high precision accumulator value by adding and storing data values having thirty data bits. The thirty bits of accumulated sum are truncated to a twelve bit MSB data value when supplied to adder 63. As hereinbefore mentioned, pulse detector circuit 46, capture circuit 48, phase increment generator 56, and subcarrier phase accumulator 58 are referred to as the long term stability path. Thus, the long term stability path detects a relationship between the clock signals CLK27 and REF_CLK27 and provides a first portion of the phase correction value.

Figure 7:
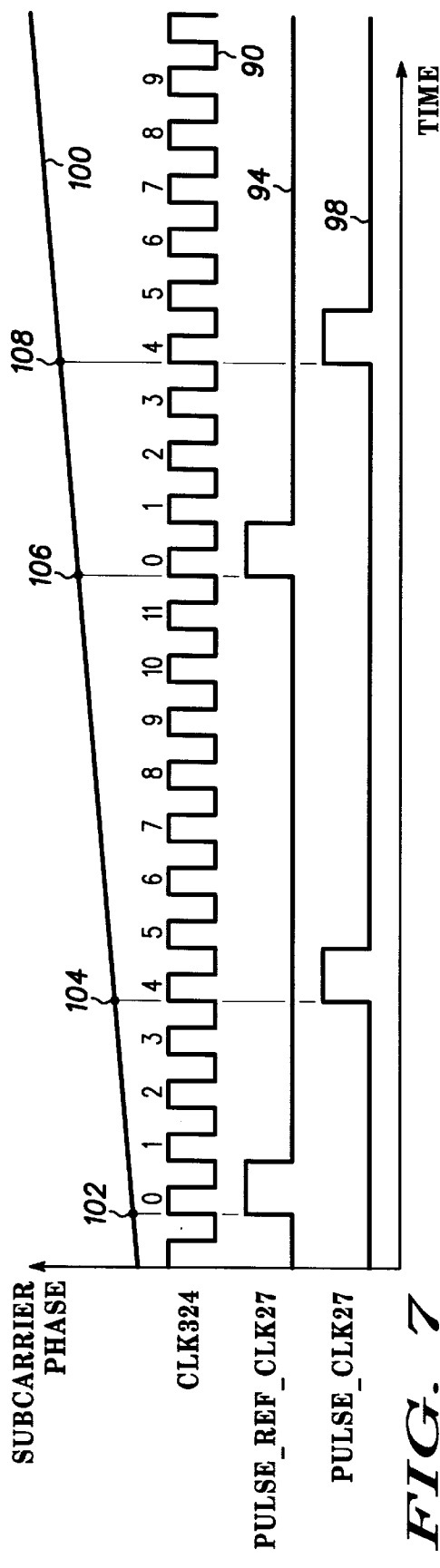
FIG. 7 is a plot that is generated based on a reference clock and interpolated values of subcarrier phase are derived for the signal PULSE_CLK27.

FIG. 7 shows that the phase generated by subcarrier phase accumulator 58 is linearly interpolated over twelve clock cycles, with only the phase samples corresponding to PULSE_CLK27 being generated. The horizontal axis represents time and the vertical axis represents subcarrier phase. The clock signal CLK324 is illustrated by waveform 90, the signal PULSE_REF_CLK27 is illustrated by waveform 94, and the signal PULSE_CLK27 is illustrated by waveform 98. The numbers 0–11 along the horizontal axis indicate the number of periods for the clock signal CLK324 that follow the signal PULSE_REF_CLK27. The clock signal CLK324 has a frequency that is chosen as twelve times the frequency of the clock signal CLK27.

Line 100 represents the interpolated subcarrier phase. Phase values 102 and 106 represent values on line 100 that are generated by subcarrier phase accumulator 58, while phase values 104 and 108 represent values on line 100 that are interpolated values corresponding to the signal PULSE_CLK27. As shown in FIG. 6, the signal PULSE_REF_CLK27 is generated at time $t_1$ after the rising edge at time $t_0$ of the signal REF_CLK27, a delay of about two or three clock periods of the signal CLK324. FIG. 7 shows that phase values 102 and 106 are generated after the occurrence of the pulses for the signal PULSE_REF_CLK27. The data values for the subcarrier phase circuitry, as illustrated by line 100, are generated by circuitry in the long term stability path. Thus, a subcarrier phase value is generated based on the reference clock signal REF_CLK27 and an interpolated subcarrier phase value is derived for the clock signal CLK27. Unlike prior art digital video encoders that must receive phase correction data via a serial interface or through the ITU-R656 interface, the present invention interpolates a subcarrier phase value from a generated phase value based on a reference clock.

The short term stability path includes counter 60, capture circuit 48A, and phase look-up table 62. Counter 60 is reset by the signal PULSE_REF_CLK27 and incremented by the clock signal CLK324 to provide address locations to phase look-up table 62. Counter 60 is a modulo counter having a modulus of twelve, although this is not a requirement of the present invention. Additional counter stages may be included for providing more than twelve address locations in accounting for a slow REF_CLK27 signal. Capture circuit 48A latches the count generated by counter 60 when the signal PULSE_CLK27 has a rising edge.

Phase look-up table 62 receives the address provided from capture circuit 48A and provides a corresponding output value. The output value is based upon the user defined TV_standard, i.e., NTSC, PAL, PAL-M, or PAL-N. When the signal PULSE_REF_CLK27 and PULSE_CLK27 have logic one values that coincide, then phase look-up table 62 provides an output value of zero. When the signal PULSE_CLK27 is one clock period (CLK324) after the signal PULSE_REF_CLK27, the new address supplied to phase look-up table 62 causes an output value, for example, of about 45 when the TV_standard selects NTSC. When the signal PULSE_CLK27 is two clock periods (CLK324) after the signal PULSE_REF_CLK27, then the output value from phase look-up table 62 is about two times 45. When the signal PULSE_CLK27 is eleven clock periods (CLK324) after the signal PULSE_REF_CLK27, the output value is about 11 times 45, or a value of about 498. The output value supplied from phase look-up table 62 is a twelve bit data value. By way of another example, when the TV-standard selects PAL B, D, G, H, or I, then phase look-up table 62 provides an output value, for example, of about 56 and multiples thereof. The short term stability path includes counter 60, capture circuit 48A, and phase look-up table 62, and provides a short term correction factor for the difference in phase between the signal CLK27 and the reference clock signal REF_CLK27.

The twelve bit data value provided by subcarrier phase accumulator 58 is summed with the twelve bit data value provided by phase look-up table 62. The overflow bit is discarded and the twelve remaining bits of the summed value are passed to phase filter 64 for filtering the interpolation noise. Referring to FIG. 5, the phase cannot be filtered directly due to the phase jumps that occur when the phase wraps around. Thus, the interpolated phase is limited to the phase interval ranging from 0 to $(2^{12}-1)$, which corresponds to a phase value that ranges from 0 to $2\pi$. By first taking the derivative of the phase and then filtering, the phase increments are derived. Filter 76 is a low pass filter such as, for example, an Infinite Impulse Response (IIR) filter or a Finite Impulse Response (FIR) filter. Integrator 80 regenerates the phase for the sine and cosine generator 65 (see FIG. 3). Delay compensator 78 compensates for time delays that are introduced by chroma modulator 30. Sine and cosine generator 65 synthesizes a sine wave and a cosine wave that are used by the chrominance modulator 30 (see FIG. 2).

By now it should be appreciated that a digital video encoder receives a reference clock signal REF_CLK27 and generates a phase correction value that is interpolated to provide a proper phase for a video subcarrier signal. The present invention for the digital video encoder circuit does not require that separate frequency correction data be transmitted from the digital video decoder circuit to the digital video encoder circuit to preserve the quality of the chrominance data. Even when the video source of the digital video decoder is a VCR, the digital video encoder of the present invention generates a stable chrominance subcarrier locked to the frequency of the reference clock REF_CLK27 and the chrominance data has an acceptable quality.

What is claimed is:

1. A video encoding circuit, comprising:

a first input terminal for receiving a data signal;

a second input terminal for receiving a clock signal that has a frequency corresponding to that of the data signal;

a third input terminal coupled for receiving a reference clock signal that is used with the clock signal to generate a phase correction value for a video subcarrier signal supplied at an output terminal of the video encoding circuit;

a detector circuit having a first input for receiving the clock signal, a second input for receiving the reference clock signal, and an output for supplying a data value that corresponds to a number of transitions of the reference clock signal between transitions of the clock signal;

a generator having a first input coupled to an output of the detector circuit and providing a phase increment value based on the data value; and an accumulator having an input coupled for receiving the phase increment value and an output for providing a portion of the phase correction value.

2. The video encoding circuit of claim 1, wherein the detector circuit further includes:

a first plurality of latches that form a first delay line having an input for receiving the reference clock signal;

a second plurality of latches that form a second delay line having an input coupled to an output of the first delay line;

a first logic gate having inputs coupled to outputs of the first plurality of latches; and a second logic gate having inputs coupled to outputs of the second plurality of latches, where outputs of the first and second logic gates provide the data value.

3. The video encoding circuit of claim 1, wherein the generator further includes a second input coupled for receiving a TV_standard signal that selects from a group of NTSC, PAL, PAL-M, or PAL-N and provides the phase increment value.

4. A video encoding circuit, comprising:

a first input terminal for receiving a data signal;

a second input terminal for receiving a clock signal that has a frequency corresponding to that of the data signal;

a third input terminal coupled for receiving a reference clock signal that is used with the clock signal to generate a phase correction value for a video subcarrier signal supplied at an output terminal of the video encoding circuit;

a counter having inputs for receiving the reference clock signal and another clock signal;

a latch having an input coupled to an output of the counter and latching a count value based on a difference in phase between the clock signal and the reference clock signal; and a phase look-up table having a first input coupled to an output of the latch and an output for providing a phase value.

5. The video encoding circuit of claim 4, wherein the phase look-up table further includes a second input coupled for receiving a TV_standard signal.

6. The video encoding circuit of claim 4, further including a summing circuit having a first input coupled to the output of the phase look-up table and a second input coupled to the output of the accumulator.

7. The video encoding circuit of claim 6, further including a phase filter having an input coupled to an output of the summing circuit, where the phase filter further includes:

a differentiator having an input coupled to the input of the phase filter;

a filter having an input coupled to an output of the differentiator; and an integrator having an input coupled to an output of the filter and an output coupled to an output of the phase filter.

8. The video encoding circuit of claim 7, wherein the phase filter further includes:

a delay compensator having an input coupled to the output of the filter; and an adder circuit having a first input coupled to an output of the delay compensator, a second input coupled to the output of the integrator, and an output providing an output signal of the phase filter.

9. A method of generating a phase correction value, comprising the steps of:

providing a first signal having a first frequency;

providing a second signal having a second frequency;

generating a digital value based on a relationship of the first and second frequencies;

generating an integer multiple of a phase increment value based on the digital value, where the integer has a first value when the first frequency is greater than the second frequency, a second value when the first frequency is substantially the same as the second frequency, and a third value when the first frequency is less than the second frequency; and summing the integer multiple of the phase increment value with a previous phase increment value in providing an accumulated value as a first portion of the phase correction value.

10. The method of claim 9, wherein generating a digital value further comprises the steps of:

detecting two consecutive transitions from a first logic value to a second logic value of the first signal; and determining a number of transitions from the first logic value to the second logic value of the second signal that are located between the two consecutive transitions of the first signal.

11. The method of claim 9, wherein generating the integer multiple of the phase increment value further includes the step of providing the phase increment value based on a TV_standard signal.

12. The method of claim 9, wherein selecting an integer multiple of the phase increment value further includes the step of selecting the first value to be zero when the first frequency is greater than the second frequency.

13. The method of claim 9, wherein selecting an integer multiple of the phase increment value further includes the step of selecting the first value to be one when the first frequency is substantially the same as the second frequency.

14. The method of claim 9, wherein selecting an integer multiple of the phase increment value further includes the step of selecting the first value to be two when the first frequency is less than the second frequency.

15. A method of providing chrominance lock in a digital video encoder circuit, comprising the steps of:

generating a first phase correction value based on a number of transitions from a first logic state to a second logic state of a first signal that occur between two consecutive transitions from the first logic state to the second logic state of a second signal;

adding the first phase value to an accumulated phase value to generate an accumulated value;

generating a third signal having a frequency that is an integer multiple of the frequency of the second signal;

determining a number of clock periods of the third signal that separate a transition from the first logic state to the second logic state of the first signal and a transition from the first logic state to the second logic state of the second signal;

providing a second phase value as a product of the first phase value and the number; and summing the accumulated value and the second phase value.

* * * * *